July 14, 1925.
F. J. SNOOK
1,545,859
OPENING OF HERMETICALLY SEALED TINS WITH LEVER LIDS
Filed Oct. 13, 1922
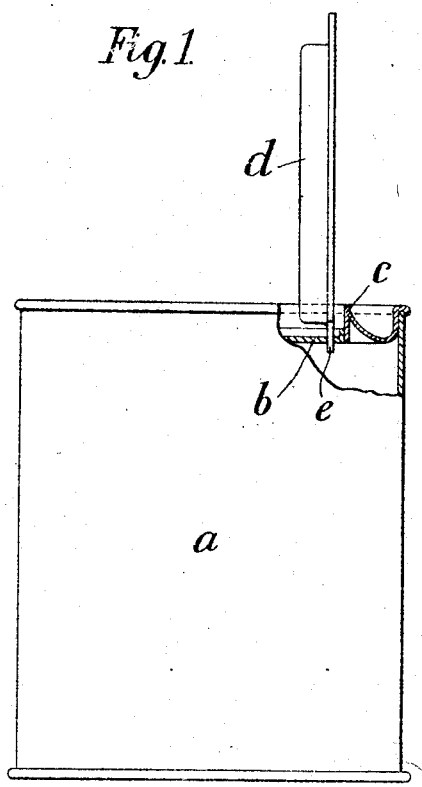
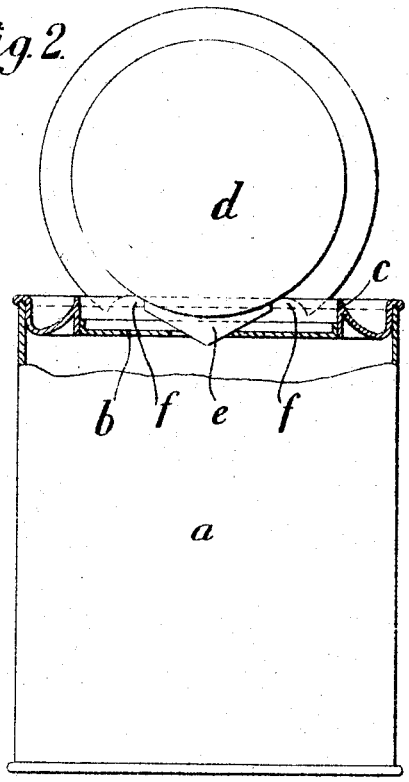
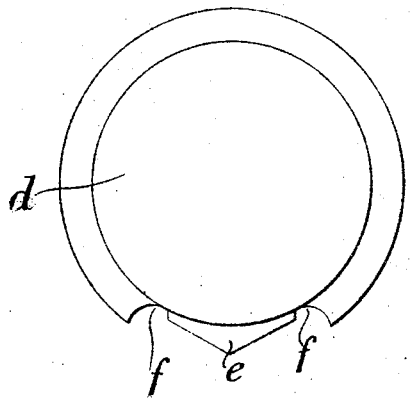
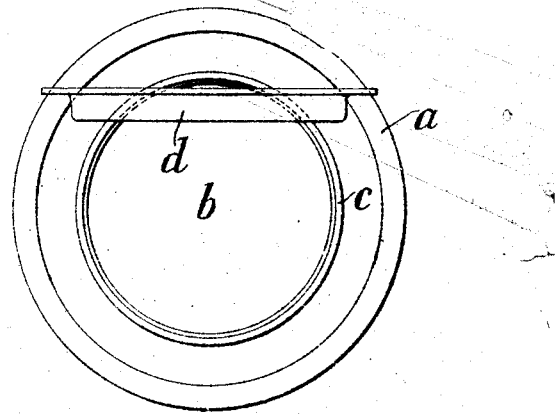
Inventor
Frederick J. Snook
By George A. Prevost
atty Patented July 14, 1925.

1,545,859

UNITED STATES PATENT OFFICE.

FREDERICK JOSEPH SNOOK, OF SALISBURY, ENGLAND.

OPENING OF HERMETICALLY-SEALED TINS WITH LEVER LIDS.

Application filed October 13, 1922. Serial No. 594,269.

*To all whom it may concern:*

Be it known that I, FREDERICK JOSEPH SNOOK, a subject of the King of Great Britain, residing at 9 Wyndham Road, Salisbury, Wiltshire, England, have invented new and useful Improvements Relating to the Opening of Hermetically-Sealed Tins with Lever Lids, of which the following is a specification.

My invention relates to hermetically sealed tins fitted with lever lids and has for its object to so construct the lids that they can be utilized for opening the tins.

My improvements in no way impair the usefulness of the lever lid and do not involve the addition, and fixing of any knife, or cutter, to the said lid. Moreover, the lid is always ready for use, requires no adjustment, and effects considerable economy in manufacture.

In the accompanying drawing—

Figure 1 is a sectional elevation of a cylindrical tin designed to be closed by a lever lid and hermetically sealed by a tagger plate or top, the lid being formed in accordance with my invention and shown in position for cutting the said plate.

Figure 2 is a sectional elevation at right angles to Figure 1,

Figure 3 is a plan view thereof, and

Figure 4 is an underside view of the lid.

*a* is the tin hermetically sealed by the tagger plate *b* and having the inner rim *c*. *d* is the lever lid designed to fit normally within the said rim *c*.

In carrying out the invention a portion of the flange of the lid *d* is cut away so as to leave a broad tongue *e* ending in a point to form a cutter, with a groove or notch *f* at each side of it, as shown in Figures 2 and 4.

To open the tin the lever lid is removed from its normal position within the rim *c* and is then placed on its edge over the top of the tin with the tongue cutter *e* at the bottom and with the upper side of the lid held towards the outside of the tin, as indicated in Figures 1 and 3, and forced downwards in such a position that the two grooves or notches *f* fit down on to the inner rim *c* and the tongue cutter *e* is pressed down on to and pierces the tagger top *b*, as shown in Figures 1 and 2. The lid is then forced or drawn round the top of the tin, it being guided by the two grooves or notches *f* running round on the inner rim *e*, with the result that the tagger top *b* is completely cut round, and can be removed to expose the contents of the tin.

When the cutting operation is complete the lever lid can be again fitted within the rim *c* to close the tin.

Claims:

1. The combination with a tin having a depressed hermetically sealed top, of a lever lid comprising a body portion adapted to fit within said depressed top and a flange provided with a cutting tongue in the plane of the lid adapted to be used in opening said hermetically sealed top.

2. The combination with a tin having a depressed hermetically sealed top, of a lever lid comprising a body portion adapted to fit within said depressed top and a flange provided with a cutting tongue formed from said flange in the plane of the lid and adapted to be used in opening said hermetically sealed top.

3. The combination with a tin having a depressed hermetically sealed top which forms an inner rim around the top of said tin, of a lever lid comprising a body portion adapted to fit within said depressed top, a flange provided with a cutting tongue in the plane of the lid, said flange having recesses therein to form guides for said cutting tongue.

4. The combination with a tin as claimed in claim 3 wherein the said guides engage said inner rim of the tin, when cutting the sealed top.

FREDERICK JOSEPH SNOOK.